Patented Mar. 5, 1935

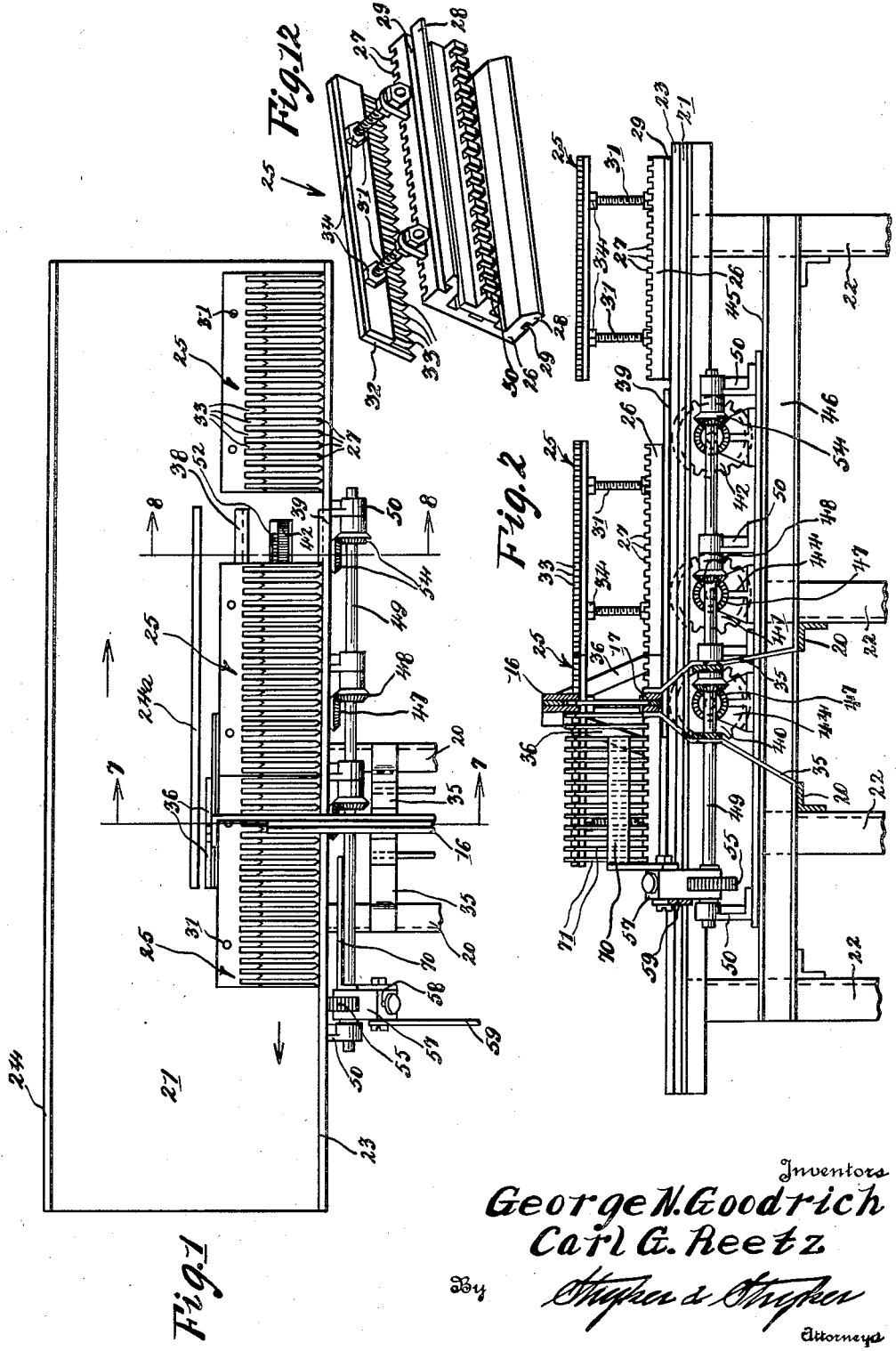

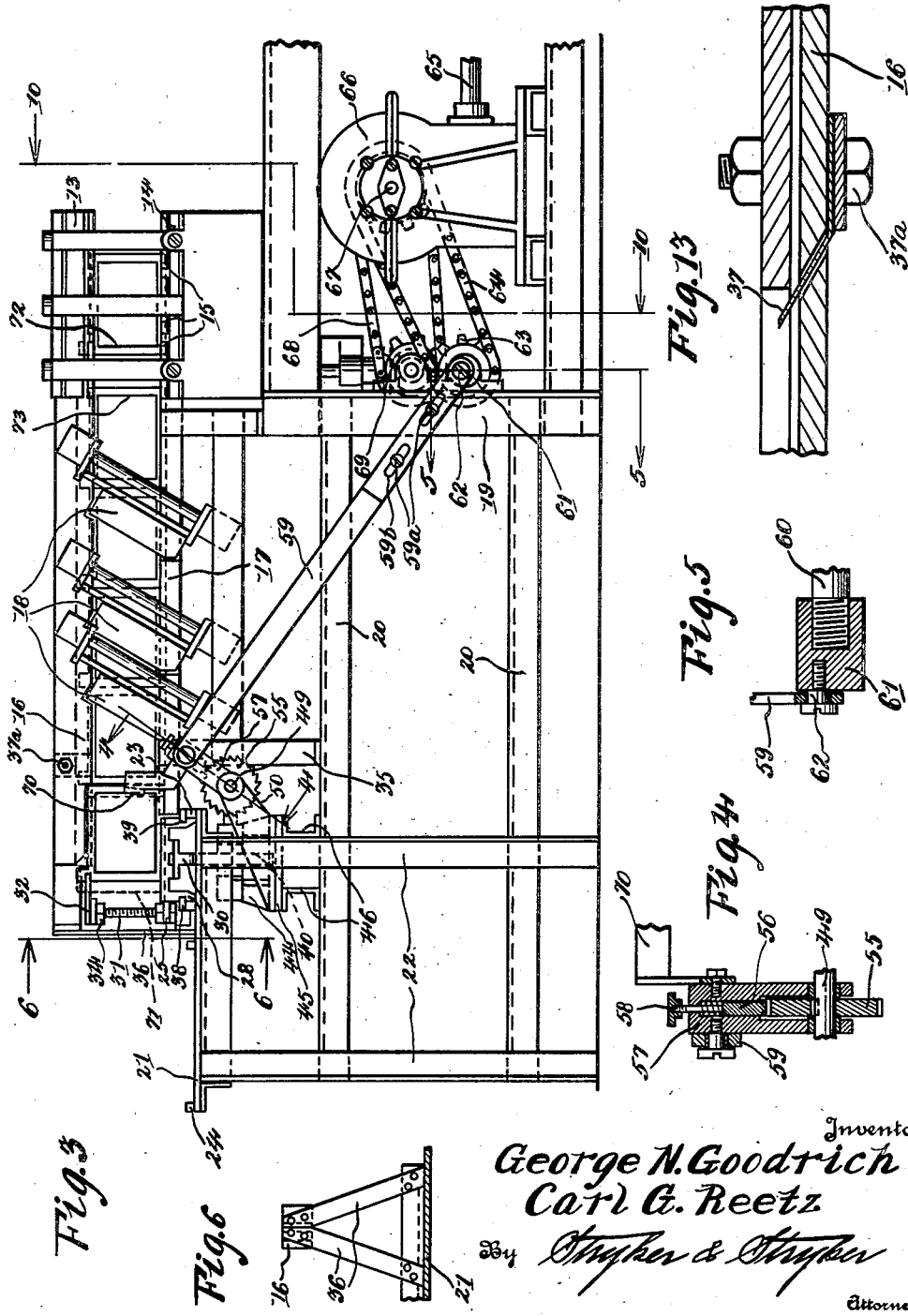

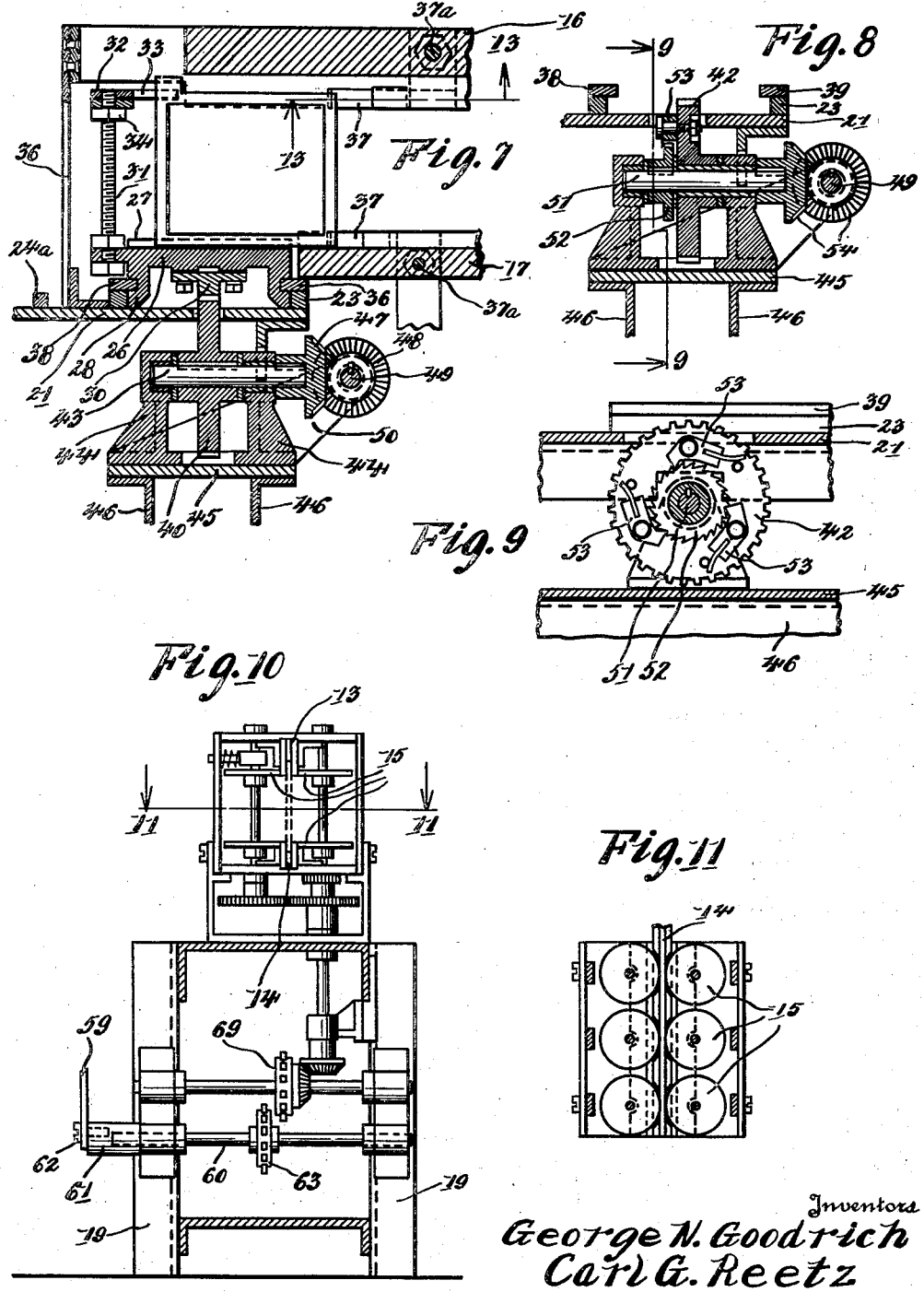

1,993,370

UNITED STATES PATENT OFFICE 1,993,370

COLLECTING MACHINE FOR BATTERY PLATES

George N. Goodrich, Walled Lake, Mich., and Carl G. Reetz, St. Paul, Minn., assignors to National Battery Company, St. Paul, Minn., a corporation of Delaware Application March 7, 1931, Serial No. 520,987
Renewed July 27, 1934

15 Claims. (Cl. 226—39)

Heretofore, in the manufacture of plates for storage batteries, the step of collecting the freshly filled plates in proper spaced relation to each other preparatory to drying has been an expensive hand operation.

It is our object to provide a novel and efficient machine for automatically and rapidly collecting the plates in groups where they are supported in the desired spaced, parallel relation to each other. Other objects will appear and be more fully pointed out in the following specification and claims.

In the accompanying drawings:

Figure 1 is a plan view of our collecting table, plate carriages and operating mechanism therefor;

Fig. 2 is a side elevation of the same;

Fig. 3 is an end view of the collecting machine together with the portion of the pasting machine which delivers the plates to be collected in groups.

Fig. 4 is a fragmentary section through the ratchet connection for the power drive, taken on the line 4—4 of Fig. 3;

Fig. 5 is a fragmentary section taken on the line 5—5 of Fig. 3;

Fig. 6 is a fragmentary vertical section taken on the line 6—6 of Fig. 3;

Figs. 7 and 8 are vertical sections taken on the lines 7—7 and 8—8 respectively of Fig. 1;

Fig. 9 is a vertical section taken on the line 9—9 of Fig. 8;

Fig. 10 is an irregular section taken on the line 10—10 of Fig. 3;

Fig. 11 is a horizontal section taken on the line 11—11 of Fig. 10;

Fig. 12 is a perspective view of one of the plate carriages; and

Fig. 13 is a horizontal section taken on the line 13—13 of Fig. 7.

The freshly filled plates are preferably received directly from a pasting machine. Our collecting machine is shown in connection with the pasting machine of our copending application Serial No. 491,574, filed October 27, 1930, from which the plates are delivered in vertical position between upper and lower guides 13 and 14 respectively (Figs. 3 and 10). Pairs of feed wheels 15 grip the upper and lower edges of the plates and positively advance them to and along the upper and lower guides 16 and 17, the plates being moved in edge to edge engagement with each other. Troweling blades 18, at opposite, lateral faces of the plates, compress, distribute and smooth the moist paste, as more fully described in our co-pending application above identified. The guides 16 and 17 are supported on a suitable frame having legs 19 and transverse members 20. Adjacent to the delivery ends of said guides is mounted a collecting table having a top 21 and legs 22 which are preferably rigidly connected to the members 20 of the pasting machine frame. The table top 21 has a guide bar 23 along its front edge, a similar bar 24 along its rear edge and a short central guide bar 24a between the other two.

Carriages 25 are provided, each for a group of spaced plates to be dried. As the carriages are similar only one will be described in detail. Each has a base 26 upon the upper, normally horizontal surface of which is located a series of spaced, parallel members 27. At each longitudinal edge a flange 28 extends downward and is formed with a longitudinal groove 29 to slidably receive a guide bar. The bottom of the base 26 has a toothed rack 30 to engage a driving pinion as hereinafter described, and uprights 31 at the back of the carriage are provided to support a top plate 32. The front edge of this top plate is slotted to form a series of fingers 33 which project horizontally, directly above the spacing bars 27, to support the plates. The uprights 31 are preferably threaded in the plate 32 and suitable lock nuts 34 are placed beneath said plate to retain it in adjusted position.

As best shown in Figs. 2, 3 and 6, the delivery end of the lower guide 17 is supported by bracket arms 35, projecting up from a pair of the members 20, and the delivery end of the upper guide 16 is supported on the table 21 by brackets 36. One of the side members of the guide 16 terminates short of the other to permit the lugs on the plates to pass laterally out of the guide and the lower edge of this shorter guide member is cut away to free the upper edge of a plate which has been delivered to one of the carriages 25, as hereinafter described.

To aid in separating the rear edge of one plate from the front edge of the succeeding plate on the guides 16 and 17, we provide small springs 37 which project into the path of the plates. As best shown in Figs. 7 and 13, these springs are secured to the outer faces of the guides 16 and 17 by bolts 37a and their free ends pass through slots in said guides to project obliquely and thereby thrust the plates laterally.

A guideway for the carriages 25 is provided along the front edge of the table 21. This guideway is formed by the bar 23 and a bar 38 extending parallel to the bar 23. The bar 38 projects into one of the grooves 29 and a bar 39 on the upper surface of the bar 23 projects into the other groove 29 to positively retain the carriages on the table. The table top 21 has openings midway between the guide bars 38 and 39 through which the upper peripheries of spur gears 40, 41 and 42 project to engage the toothed racks 30 on the carriages. The gears 40 and 41 are fixed on shafts 43 supported, as shown in Fig. 7, in bearings 44. These bearings are in turn supported on a horizontal plate 45 secured to longitudinal frame members 46. A projecting end of each of the shafts 43 has a beveled pinion 47 secured thereto to be driven by a similar pinion 48 fixed on a drive shaft 49. The bearings for the shaft 49 are supported in brackets 50 secured to the plate 45.

To support the spur gear 42, a shaft 51 is journaled in bearings like the bearings 44 and adjacent to the face of the gear is a ratchet wheel 52 fixed on the shaft 51. Mounted on the face of the gear 42, adjacent to the ratchet wheel 52, is a series of spring pressed pawls 53 to establish driving connection between the shaft 51 and gear 42, said gear being otherwise free to rotate on said shaft. The pawls 53 are arranged to rotate the gear 42 only in such direction as to advance the carriages 25 from right to left, as seen in Figs. 1 and 2. Driving connection between the shafts 49 and 51 is established by a pair of beveled gears 54.

For turning the shaft 49 a ratchet wheel 55 is fixed thereon near one end and a pawl 56 is mounted in a recess in an arm 57 to engage the ratchet wheel. As shown in Fig. 4, the pawl 56 is pressed into engagement with the periphery of the ratchet wheel 55 by a small spring and a projecting pin 58 is connected to the pawl to permit manual retraction of the same against the action of the spring. The arm 57 is pivoted on the shaft 49 and is actuated by a long connecting rod 59. Screws 59a adjustably connect telescoping sections of the rod 59, said screws extending through slots 59b in one of the sections so that the effective length of the rod may be adjusted. Journaled in suitable bearings on the legs 19, is a horizontal drive shaft 60 having a head 61 fixed on one end (Figs. 3, 5 and 10). This head has an eccentric crank pin 62 threaded therein to join it to the connecting rod 59. The shaft 60 is driven by a suitable sprocket wheel 63 and chain 64 and a motor-driven shaft 65, for driving both the pasting and collecting machines, operates through suitable speed reducing gears in a housing 66, a horizontal shaft 67. Sprocket wheels on the latter shaft drive both the chain 64 and a chain 68 connected to a sprocket wheel 69 (Figs. 3 and 10). The feed wheels 15 have suitable driving connections with the sprocket wheel 69.

Rigidly secured to the arm 57 is an arm 70 which, as shown in Figs. 1, 2 and 3, is arranged to extend adjacent to the front edges of plates 71 on one of the carriages 25. When the arm 57 is oscillated, the arm 70 moves the plates to proper position on the carriages and aligns their front edges.

Operation

In operation, the plates are fed to the guides 13 and 14 at a speed slower than the peripheral speed of the feed wheels 15 so that as soon as a plate, such as the plate 72 shown in Fig. 3, is in the grip of the wheels 15 it is spaced from the succeeding plate and is then thrust against the rear edge of the preceding plate 73. It will be understood that the plates are in edge to edge engagement with each other during their passage along the guides 16 and 17, but they are thrust along these guides intermittently by the action of the wheels 15. After the troweling operation, performed by the blades 18, the plates are delivered successively from the ends of the guides 16 and 17 onto the carriages 25 and the carriages are advanced in step by step movement along the way formed by the guide bars 38, 39 and 23.

Assuming that the operation is started with all of the carriages out of engagement with the guide bars 38 and 39, the first carriage is manually slid over the table top into engagement with the bar 23 near the right end of the table, as seen in Figs. 1 and 2. Now, the first carriage is thrust forward until the bars 38 and 39 engage in the grooves 29 and the gear 42 engages the rack 30. The operator may then release the carriage and it will be further advanced by the power-drive. The shaft 60, being driven continuously by its connections with the motor (not shown), rotates the eccentric head 61 so that the connecting rod 59 is given reciprocating movement and actuates the arm 57 to intermittently turn the shaft 49. Each forward stroke of the rod 59 causes the shaft 49 to turn through an angle sufficient to advance the carriages 25 a distance equal to the center to center space between the bars 27, the connection between the shaft 49 and carriages being established through the beveled pinions 47, 48 and 54, and shafts 43 and 51, and gears 40, 41 and 42. Thus a carriage in engagement with any of the gears 40, 41 or 42 will be advanced the desired distance for each step. In timed relation with this step by step feed of the carriages, the wheels 15, which deliver the plates from the guides 16 and 17 are rotated to advance the plates. The speed of the wheels 15 being greater than that of the plates as they are fed to said wheels, it will be evident that the advance of the plates along the guides 16 and 17 is intermittent or in the nature of step by step movement. The timing is so regulated that the plates have a dwell in their movement along the guides 16 and 17 after each advance equal to their length.

By adjusting the effective length of the connecting rod 59, the space between a pair of the bars 27 may be caused to register with the delivery end of the guides 16 and 17 during the period when a plate is being delivered from said guides and once this adjustment has been made, the further operation of the machine is automatic in successively presenting spaces on the carriages in proper registry with the delivery ends of the guides 16 and 17.

The carriages 25 are designed to be placed in end to end engagement with each other to form, in effect, a continuous receptacle. By providing the ratchet and pawl connection between the gear 42 and its drive shaft, we facilitate the placing of the carriages in end to end engagement with each other. Thus, if a carriage is allowed to pass out of engagement with the gear 42 before another carriage is placed in engagement with the rear end of the first mentioned carriage, the operator merely advances the rear carriage manually along the way (in engagement with the gear 42) until the rear carriage engages the preceding one, while the pawls 53 permit the gear 42 to rotate at an increased speed. As soon as the rear carriage is released, the gear 42 performs its normal function of advancing the carriage in proper step by step movement. As each carriage is filled, the plates are thrust to their final position by the arm 70 which oscillates with the arm 57. When a carriage passes out of engagement with the gear 40 it has been filled and is free to be moved to the back of the table 21. At this point it is our practice to have an operator apply a carrier, of any suitable or well known construction, to the filled carriage and then remove the group of plates and place it in the drying rack. The empty carriage is finally moved to the right (Figs. 1 and 2) between the guide bars 24 and 24a and the cycle is complete.

We have illustrated and described one suitable arrangement of our invention, but it will be understood that numerous modifications may be made within the broad scope of the invention as defined in the appended claims. For example, the battery members may be fed to a receiver or carriage in any position from the horizontal to the vertical, the carriages may be indexed or fed in any desired position of travel from the horizontal to the vertical and the delivery guides for the battery members may be placed at any desired incline or angle of slope to feed the carriages in any suitable position.

Having described our invention what we claim as new and desire to protect by Letters Patent is:

1. A machine of the class described having in combination, means for feeding battery members or the like along a determined path, a plurality of carriages movable transversely of said path and each having members for supporting a group of the battery members or the like in spaced relation to each other, spur gears severally and positively engaging said carriages for feeding them in end to end engagement with each other transversely of said path, a power-driven member and a connection between said feeding member and said gear engaging the rear carriage adapted to permit said rear carriage to be advanced independently of the power-drive into engagement with the preceding carriage.

2. A machine of the class described having in combination, guides for the upper and lower edges of plates in vertical positions, means for delivering the plates at an end of said guides, a series of carriages movable horizontally at the delivery end of said guides to receive plates therefrom and each having members for supporting a group of plates in spaced relation to each other and means for moving said carriages in step by step movement to successively present said members in alignment with said ends of the guides.

3. A plate collecting machine comprising, a guide for vertically disposed plates, a way extending horizontally transversely of said guide at the delivery end thereof, a plurality of carriages each adapted to receive and support a group of vertically disposed, spaced plates, means for retaining said carriages in end to end engagement with each other on said way, means for delivering plates successively from said guide and means for actuating said carriages in step by step movement along the way.

4. A plate collecting machine comprising, a horizontally extending guide for vertically disposed plates, a way extending horizontally transversely of said guide at the delivery end thereof, a plurality of grid carriages each adapted to receive and support a group of vertically disposed, spaced plates, driving means for simultaneously feeding said carriages along said way, means for intermittently delivering plates from said guide to said carriages and power-driven means for actuating said driving means in step by step movement to feed the carriages along said way during the interval between deliveries of plates to the carriages.

5. A plate collecting machine comprising, a guide for vertically disposed plates, a way extending horizontally transversely of said guide at the delivery end thereof, a plurality of plate carriages each adapted to receive and support a group of vertically disposed, spaced plates, driving gears for simultaneously feeding a plurality of said carriages in end to end engagement with each other along said way, means for intermittently delivering plates from said guide to said carriages and power-driven means for actuating said gears to advance said carriages in step by step movement along said way during the interval between deliveries of plates to the carriages.

6. A plate collecting machine comprising, a guide for vertically disposed plates, a way extending horizontally transversely of said guide at the delivery end thereof, a plurality of plate carriages each adapted to receive and support a group of vertically disposed, spaced plates, driving gears for simultaneously feeding a plurality of said carriages in end to end engagement with each other along said way, means for intermittently delivering plates from said guide onto said carriages, power-driven means for actuating said gears to advance said carriages in step by step movement along said way and a ratchet and pawl connection between one of said gears and said power-driven means to permit a rear carriage to be advanced to engage the preceding carriage during the power-driven advance of the carriages.

7. In a machine of the class described, means for feeding battery plates edgeways along a horizontal path, an assembling table at the delivery end of said path, plate carriages movable on said table, a guide-way for said carriages extending transversely of said path on said table, spacing members on said carriages arranged to hold the plates in spaced parallel relation to each other, said carriages being freely movable to and from said guide-way and power-driven means for actuating said carriages along said way to bring the spaces between said spacing members successively into registry with said path.

8. In a machine of the class described, a track for guiding the lower edges of battery plates, means for moving said plates edgeways along said track, a support for a carriage at the delivery end of said track, a carriage movable transversely of said track on said support, said carriage having a supporting surface extending in continuation of said track to receive plates therefrom, a series of fingers mounted on said carriage to space the upper portions of said plates apart, a guide for the upper edges of said plates arranged to direct the plates between said fingers and means for actuating said carriage transversely of said guide and track to successively receive the plates between said fingers.

9. In a machine of the class described, a track for guiding the lower edges of battery plates, means for moving said plates edgeways along said track, a support for a carriage at the delivery end of said track, a carriage movable transversely of said track on said support, said carriage having a supporting surface meeting, at its front edge, the delivery end of said track to receive plates therefrom, a series of fingers mounted on said carriage to space the upper portions of said plates apart, said fingers terminating short of said front edge of the carriage, a guide for the upper edges of said plates projecting above said surface to direct the plates between said fingers and means for actuating said carriage transversely of said guide and track to successively receive the plates between pairs of said fingers.

10. In a machine of the class described, a track for guiding the lower edges of battery plates, means for moving said plates edgeways along said track, a support for a carriage at the delivery end of said track, a carriage movable transversely of said track on said support, said carriage having a supporting surface extending in continuation of said track to receive plates therefrom, a series of fingers mounted on said carriage to space the upper portions of said plates apart, a guide for the upper edges of said plates projecting above said surface to direct the plates between said fingers and means for actuating said carriage transversely of said guide and track to successively receive the plates between pairs of said fingers.

11. In a machine of the class described, spaced parallel guides arranged to engage opposite faces of battery plates for directing them edgeways along a determined path, means for feeding the plates in edge to edge engagement with each other along said guides, a support for a carriage at the delivery end of said guides, a carriage movable transversely of said guides on said support, said carriage having a supporting surface arranged to slidably receive plates from said guides, the front edge of said carriage extending perpendicularly to said guides and one of said guides being shorter than the other, means for disengaging a plate from the succeeding plate upon the passage of the former beyond the end of the shorter of said guides and means for actuating said carriage transversely of said guides to successively receive the plates therefrom.

12. In a machine of the class described, spaced parallel guides arranged to engage opposite faces of battery plates for directing them edgeways along a determined path, means for feeding the plates in edge to edge engagement with each other along said guides, a support for a carriage at the delivery end of said guides, a carriage movable transversely of said guides on said support, said carriage having a supporting surface to slidably receive plates from said guides, the front edge of said carriage extending perpendicularly to said guides and one of said guides being shorter than the other and terminating adjacent to said front edge and the other of said guides projecting above said surface, spring means for disengaging a plate on said carriage from the succeeding plate upon the passage of the former beyond the end of the shorter of said guides and means for actuating said carriage transversely of said guides to successively receive the plates therefrom.

13. In a machine for collecting battery plates in spaced parallel relation to each other, a guide formed to receive said plates in edge to edge relation to each other, a carriage movable transversely of the delivery end of said guide, said carriage having supporting surfaces for said plates adapted to be positioned in a common plane with the bottom surfaces of said plates on said guide, in continuation of said guide and in end to end relation thereto, power-driven means for actuating said plates along said guide and onto said carriage and power-driven means for actuating said carriage to bring said surfaces successively into registry with the delivery end of said guide.

14. In a machine of the class described, guides for the opposite edges of battery plates, said plates being movable in edge to edge relation to each other along said guides, a carriage movable transversely of the delivery ends of said guides, said carriage having supporting surfaces for said plates adapted to be positioned in continuation of said guides and in end to end relation thereto, spacing members on said carriage arranged to hold said plates in spaced, parallel relation to each other, power-driven means for actuating said plates along said guides and onto said carriage and power-driven means for actuating said carriage, step by step, to bring the spaces between said spacing members successively into registry with the delivery ends of said guides.

15. In a machine of the class described, a horizontally extending guide for freshly pasted battery plates in edge to edge relation to each other, a carriage movable transversely of the delivery end of said guide, said carriage having guiding surfaces and horizontally disposed supporting surfaces for said plates adapted to be positioned in continuation of said guide and in end to end relation thereto, power-driven means for actuating said plates along said guide and onto said carriage and power-driven means for actuating said carriage to bring said supporting and guiding surfaces successively into registry with the delivery end of said guide.

GEORGE N. GOODRICH.
CARL G. REETZ.